Dec. 25, 1962 R. G. OSWALD 3,069,790
SCHEDULE BOARD
Filed March 2, 1960
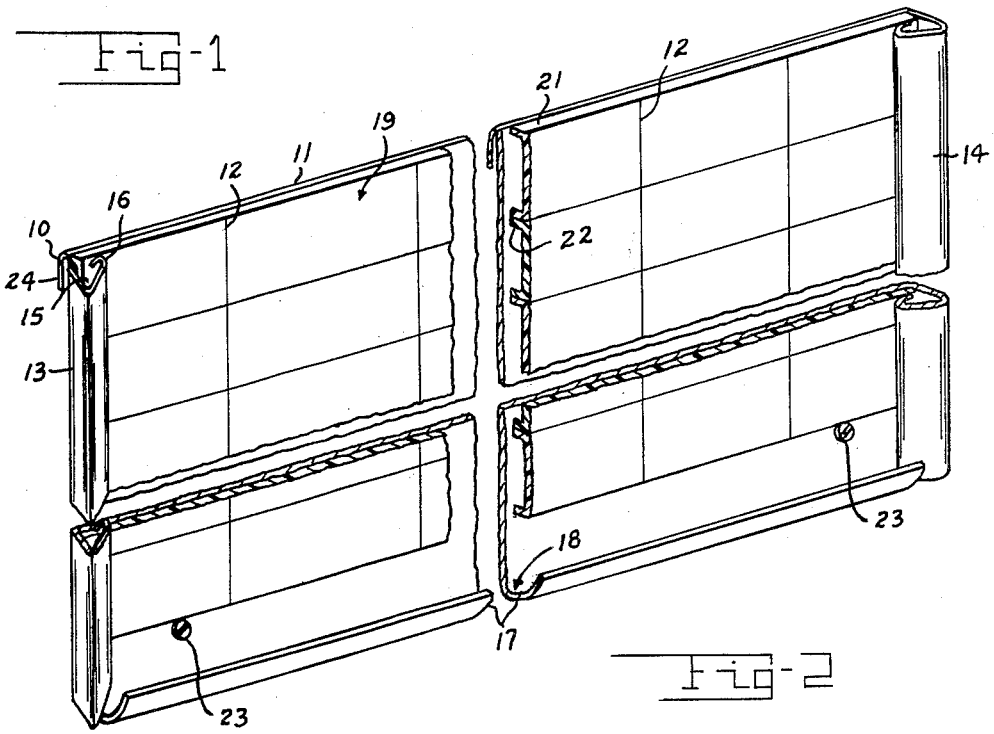
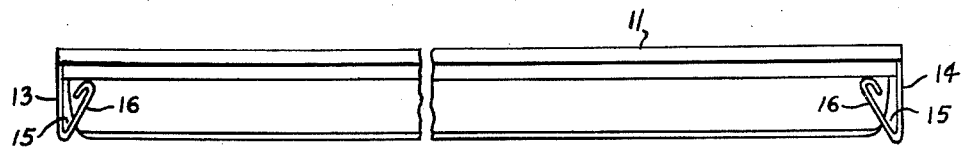
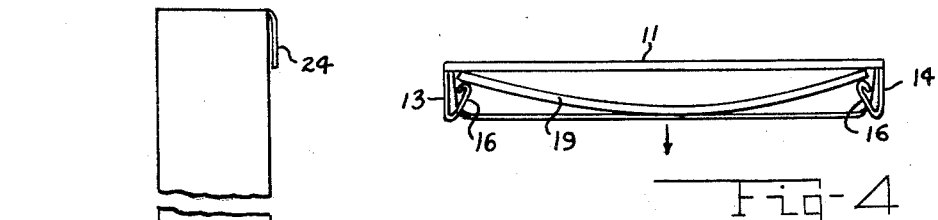
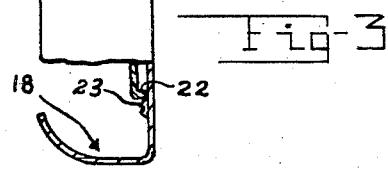
INVENTOR.
RICHARD G. OSWALD
BY Tom Walker
ATTORNEY Patented Dec. 25, 1962

3,069,790
SCHEDULE BOARD
Richard G. Oswald, Dayton, Ohio, assignor to Garrison Machine Works, Inc., Dayton, Ohio, a corporation of Ohio
Filed Mar. 2, 1960, Ser. No. 12,299
2 Claims. (Cl. 35—66)

This invention relates to schedule boards useful in industry and in office for job programming and like purposes.

Boards of the kind described commonly are wall mounted and make provision for the entry of record data thereon, and removal therefrom, on a continuing basis. Such a board provides a visual record of work to be done and the status of work in progress. For greatest utility, therefore, the board should be of a kind upon which record entries of a legible kind can easily and quickly be made, and similarly be removed, and should further offer a degree of flexibility and adaptability in the matter of revising the order of displayed data.

The instant invention it is thought achieves these and other objectives to a greater extent than similar devices of the prior art, and the provision of a schedule board so characterized is an object of the invention.

The object of the invention is to simplify the construction as well as the means and mode of operation of schedule boards, whereby such boards may not only be economically manufactured, but will be more efficient and satisfactory in use, adaptable to a wide variety of applications, and be unlikely to get out of order.

A further object of the invention is to provide a schedule board having a transparent writing surface made up of a plurality of strips of a transparent material, the strips being selectively installed upon the board in order to alter at will the order of the displayed data.

Still another object of the invention is to present a generally new schedule board characterized by simplicity and inexpensiveness of construction and wherein the transparent strips making up the writing surface are confined in a yielding manner to predetermined positions upon the board.

A further object of the invention is to provide a schedule board possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a perspective view of the schedule board embodying the present invention;

FIG. 2 is a top view thereof;

FIG. 3 is an end view thereof, partly in section, and

FIG. 4 is a diagrammatic view showing operation of the board.

Like parts are indicated by similar characters of reference throughout the several views.

Referring to the drawing, a schedule board in accordance with the illustrated embodiment of the invention comprises a mounting or back board 10 generally rectangular in shape and made of a suitably rigid and opaque material, for example sheet metal. The board 10 comprises a flat planar portion 11 on the front of which are surface markings which may include vertical lines 12 dividing the front of the portion 11 into columns and which may further include appropriate columnar headings. The marginal side edges of the board 10 are formed inwardly to define moldings 13 and 14. These are bent angularly in plural fashion to define a continuous pocket or slot 15 within each molding as well as further to define a gripping edge 16 in overlying spaced relation to the planar surface 11 as well as being in spaced relation to the innermost wall of the slot 15. The extremity of each side edge of the board is folded upon itself beyond the gripping edge 16 for purposes of reinforcement and to present a rounded surface at edge 16.

Considering the board 10 as occupying normally an upright position the bottom or lower edge thereof is turned up to form a channel member 177 defining a trough 18. The board is cut at its lower corners to facilitate the forming both of the moldings 13 and of the channel member 177.

The planar surface 11 of the mounting board is overlaid by a transparent writing surface through which the markings 12 are visible. In accordance with a feature of the instant invention the transparent writing surface is comprised of a plurality of strips 19 made of a transparent and flexible material, the strips being for example comprised of a clear styrene plastic and formed by an extrusion process. Each strip 19 has a normally straight configuration to lie flat upon the surface 11 and are generally rectangular with one broad side facing the surface 11 and the other facing outwardly. For convenience the strips of the illustrative embodiment of the invention are channel shaped in cross-section with the legs facing and resting on the surface 11 while the opposite or flat surface faces outwardly. The upper and lower edges 21 and 22 of each strip are made relatively broad and in the assembly of the strips these become bearing surfaces through which adjacent strips engage and support one another. Thus, the strips 19 are installed to extend transversely across the surface 11 of the board 10 and are stacked one upon another to form in effect an uninterrupted transparent surface over the front of the mounting board. The opposite ends of the strips 19 are received in the slots 15 at the moldings 13 and 14. The length of the strips is predetermined to place the ends thereof substantially in abutting relation with the turned over extremities of the mounting board while the spacing of the gripping edge 16 from the planar surface 11 coincides approximately with the thickness of the strips. Accordingly, in their installed positions the strips 19 are confined by the moldings 13 and 14 against any material amounts of endwise or bodily outward movements. The strips being flexible, however, they may be bowed at their middle as indicated in FIG. 4 whereupon the ends of the strip may be released from the moldings 13 and 14. In like manner a strip may be installed by flexing it first to a bowed position and then inserting the opposite ends within the slots 15 of the moldings at the selected vertical location.

The strips 19 may be held or restricted in their movement in a vertical sense by engagement of the bottom strip with the bottom of the trough 18. Alternatively, however, there may be mounted in the planar surface 11 near the trough 18 stud means 23 or the like providing rests for the lowermost strip. The stud means 23 may be provided in the form of screws forming a part of means to attach the board 10 to a wall.

The upper end of the mounting board 10 may be turned over in the manner of a tongue 24 as a reinforcement at the upper end of the mounting board.

According to a further feature of the invention, the markings on the planar surface 11 of the mounting board may be made temporary in character, as through the use of pressure sensitive tape. Thus the surface 11 may initially be blank, with the customer being supplied a kit including a selection of letters, numbers and tapes by which any desired schedule form may be constructed and one form replaced readily with another. The columns, column headings and other aspects of the form are clearly visible through the plastic strips 19 each of which is an individual writing surface upon which record entries may be made through use of a grease pencil or the like. To change the position of any strip on the board it is merely necessary to remove the selected strip in the manner before described and to reinsert it. Similarly the insertion of a new strip to alter the order of existing record entries is accomplished merely by separating adjacent strips at the selected location and inserting the new strip.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A schedule board including a back panel presenting a planar surface, means defining lines forming a base pattern on said surface, transparent strip elements positioned over said base surface through which said base pattern is visible, edge portions of said strip elements providing line forms intersecting the lines of said base pattern and together therewith forming a blank chart for recording information thereon, said strip elements providing a wipable exterior writing surface for recording information thereon, the lateral extremities of said panel being turned over on themselves to provide rounded bearing surface portions confining said elements for relative sliding with reference to said panel for adjusting the relative positioning thereof on said panel, said strip elements including projected flanges defining said edge portions to provide a mount thereof in contact with said planar surface.

2. A schedule board including, a back panel presenting a planar surface, means defining columns on said planar surface, transparent strips positioned over said surface to extend transversely thereof in edge abutting relation, the edges of said strips defining lines transversely intersecting said columns to provide a schedule form therewith, said strips providing an exterior writing surface for posting information related to said columns, and means on said panel releasably confining said strips as positioned over said planar surface, the confining portions of which present bearing surface to said strip to provide for sliding movement and adjustment thereof with reference to said panel, said strips including projected flanges defining said edges to provide a mount thereof in contact with said planar surface.

References Cited in the file of this patent
UNITED STATES PATENTS

| | | |
|---|---|---|
| 135,315 | Boucher | Jan. 28, 1873 |
| 1,096,767 | Tompkins | May 12, 1914 |
| 1,501,233 | Rand | July 15, 1924 |
| 1,541,717 | Ketchum | June 9, 1925 |
| 1,860,804 | Clark | May 31, 1932 |
| 2,502,190 | Wassell | Mar. 28, 1950 |
| 2,668,370 | Trimble | Feb. 9, 1954 |